(12) United States Patent
Kinugasa (10) Patent No.: US 8,786,723 B2
(45) Date of Patent: Jul. 22, 2014

(54) PHOTOELECTRIC-CONVERSION DEVICE (75) Inventor: Tomohisa Kinugasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 305 days.

(21) Appl. No.: 12/958,238

(22) Filed: Dec. 1, 2010

(65) Prior Publication Data

US 2011/0134272 A1 Jun. 9, 2011

(30) Foreign Application Priority Data

Dec. 7, 2009 (JP) ................................. 2009-278007

(51) Int. Cl.
H04N 5/228 (2006.01)
H04N 5/217 (2011.01)
H04N 5/335 (2011.01)

(52) U.S. Cl.
USPC .......................... 348/222.1; 348/241; 348/294

(58) Field of Classification Search
CPC .............................. H04N 5/378; H04N 5/3692
See application file for complete search history.

(56) References Cited

U.S. PATENT DOCUMENTS

| 5,698,844 | A | * | 12/1997 | Shinohara et al. | ......... 250/214 R |
| 2006/0177210 | A1 | | 8/2006 | Ichimiya | |
| 2007/0217260 | A1 | * | 9/2007 | Kitagawa | .................. 365/185.05 |
| 2009/0147120 | A1 | * | 6/2009 | Kurane | .......................... 348/311 |
| 2009/0251582 | A1 | * | 10/2009 | Oike | .............................. 348/308 |
| 2010/0002112 | A1 | * | 1/2010 | Tay | ................................. 348/294 |
| 2010/0110261 | A1 | * | 5/2010 | Ito et al. | ........................ 348/311 |
| 2010/0166405 | A1 | * | 7/2010 | Moon | ............................ 396/104 |
| 2010/0177229 | A1 | * | 7/2010 | Vampola et al. | .............. 348/308 |
| 2010/0182489 | A1 | * | 7/2010 | Kim et al. | ...................... 348/345 |
| 2010/0182494 | A1 | * | 7/2010 | Park et al. | ...................... 348/349 |
| 2011/0114823 | A1 | * | 5/2011 | Katzir et al. | ................ 250/208.1 |
| 2011/0205419 | A1 | * | 8/2011 | Fujita et al. | .................... 348/308 |
| 2012/0182468 | A1 | * | 7/2012 | Shintani | ........................ 348/373 |

FOREIGN PATENT DOCUMENTS

| EP | 757475 A2 | 2/1997 |
| JP | 9-200614 A | 7/1997 |
| JP | 2006-220684 A | 8/2006 |

* cited by examiner

Primary Examiner — Lin Ye
Assistant Examiner — John H Morehead, III
(74) Attorney, Agent, or Firm — Canon USA, Inc. IP Division (57) ABSTRACT A photoelectric-conversion device including at least two memory-cell units for a single sensor-cell unit is provided. A reset noise generated due to initialization of the sensor-cell unit is written into each of the memory-cell units at one time.

5 Claims, 9 Drawing Sheets

PHOTOELECTRIC-CONVERSION DEVICE

BACKGROUND OF THE INVENTION

1. Field of the Invention

The present invention relates to a photoelectric-conversion device and particularly relates to a photoelectric-conversion device.

2. Description of the Related Art

Usually, an auto focusing (AF) sensor for detecting a focal point is provided in image pickup systems. In recent years, the AF sensors have been expected to be capable of detecting a focal point with higher speed and higher precision.

A solid-state image pickup device including a transfer system provided to transfer a signal which is output from a sensor-cell unit to a memory-cell unit has been disclosed in Japanese Patent Laid-Open No. 09-200614. According to Japanese Patent Laid-Open No. 09-200614, a plurality of the memory-cell units may be provided.

A focus-detection device including a frame memory provided to store the accumulation signal corresponding to each of regions that are obtained by dividing a line sensor into at least two regions and a frame memory provided to store the accumulation signal corresponding to all of the regions of the line sensor has been disclosed in Japanese Patent Laid-Open No. 2006-220684. According to Japanese Patent Laid-Open No. 2006-220684, the focal-point detection can be performed with high speed even in a case of a large amount of defocus.

However, no specific circuit configurations including a plurality of memory-cell units provided for a single sensor-cell unit and the operations thereof have been disclosed in neither of Japanese Patent Laid-Open No. 09-200614 and Japanese Patent Laid-Open No. 2006-220684.

SUMMARY OF THE INVENTION

Accordingly, a device according to an embodiment of the present invention includes a plurality of unit pixels, each of the unit pixels including a sensor-cell unit that outputs a signal obtained by photoelectric conversion, and a plurality of memory-cell units, wherein a reset noise generated due to initialization of the sensor-cell unit is written into each of the memory-cell units that are provided for the sensor-cell unit at one time.

Further features of the present invention will become apparent from the following description of exemplary embodiments with reference to the attached drawings.

DESCRIPTION OF THE EMBODIMENTS

First Embodiment

First, in order to describe the benefits of the present invention, an exemplary configuration will be described. The exemplary configuration involves providing two memory-cell units for a single sensor-cell unit, as is the case with Japanese Patent Laid-Open No. 2006-220684, in a configuration disclosed in Japanese Patent Laid-Open No. 09-200614. According to Japanese Patent Laid-Open No. 2006-220684, an operation is performed to write a noise signal of the sensor-cell unit into the memory-cell unit before performing an accumulation operation. Therefore, when the two memory-cell units are provided in the configuration disclosed in Japanese Patent Laid-Open No. 09-200614, the noise-signal writing operation should be performed twice. That is, the noise signal should be written into the sensor-cell unit twice. Consequently, the timing when automatic gain control (hereinafter referred to as the AGC) is started after performing the noise-signal writing operation may be delayed.

According to the above-described exemplary configuration, a problem may occur in case of an incident light with high intensity. The incident light with high intensity causes the sensor-cell unit to reach a signal-saturation level in a short time period. Therefore, when the AGC-start time is delayed, a signal may reach the saturation level before the AGC is started and the AGC may not be performed appropriately.

Hereinafter, embodiments of the present invention, which solve the above-described problem, will be specifically described.

A first embodiment of the present invention will be described with reference to the attached drawings. The first embodiment shows an exemplary configuration where a photoelectric-conversion device is provided to perform the phase-difference focus detection (auto focusing (AF)).

Figure 1:
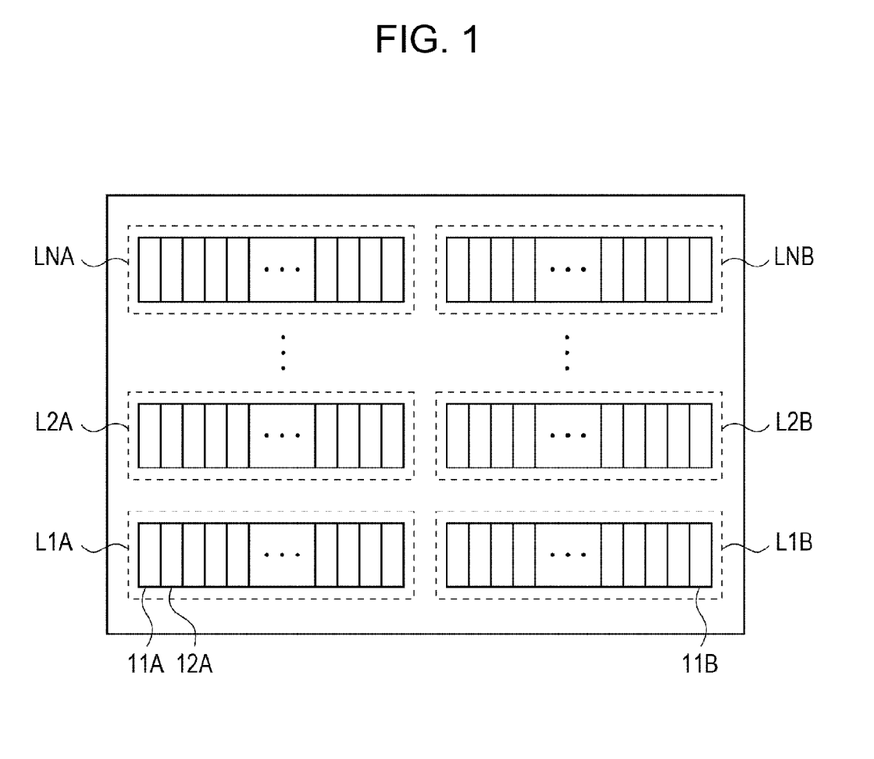
FIG. 1 is a diagram schematically illustrating an imaging area provided in a phase-difference AF photoelectric-conversion device according to a first embodiment of the present invention.

FIG. 1 schematically illustrates an imaging area provided in the phase-difference AF photoelectric-conversion device. Pairs of line-sensor units L1A and L1B, L2A and L2B, ..., and LNA and LNB are provided on the imaging area. A pair of the line-sensor units is used to measure the defocusing amount of an object image, which is observed in a given region of the imaging area. Plural pairs of the line-sensor units are arranged to provide plural range-finding points and increase the AF precision. Each of the line-sensor units includes unit pixels 11A, 12A, and so forth.

Figure 2:
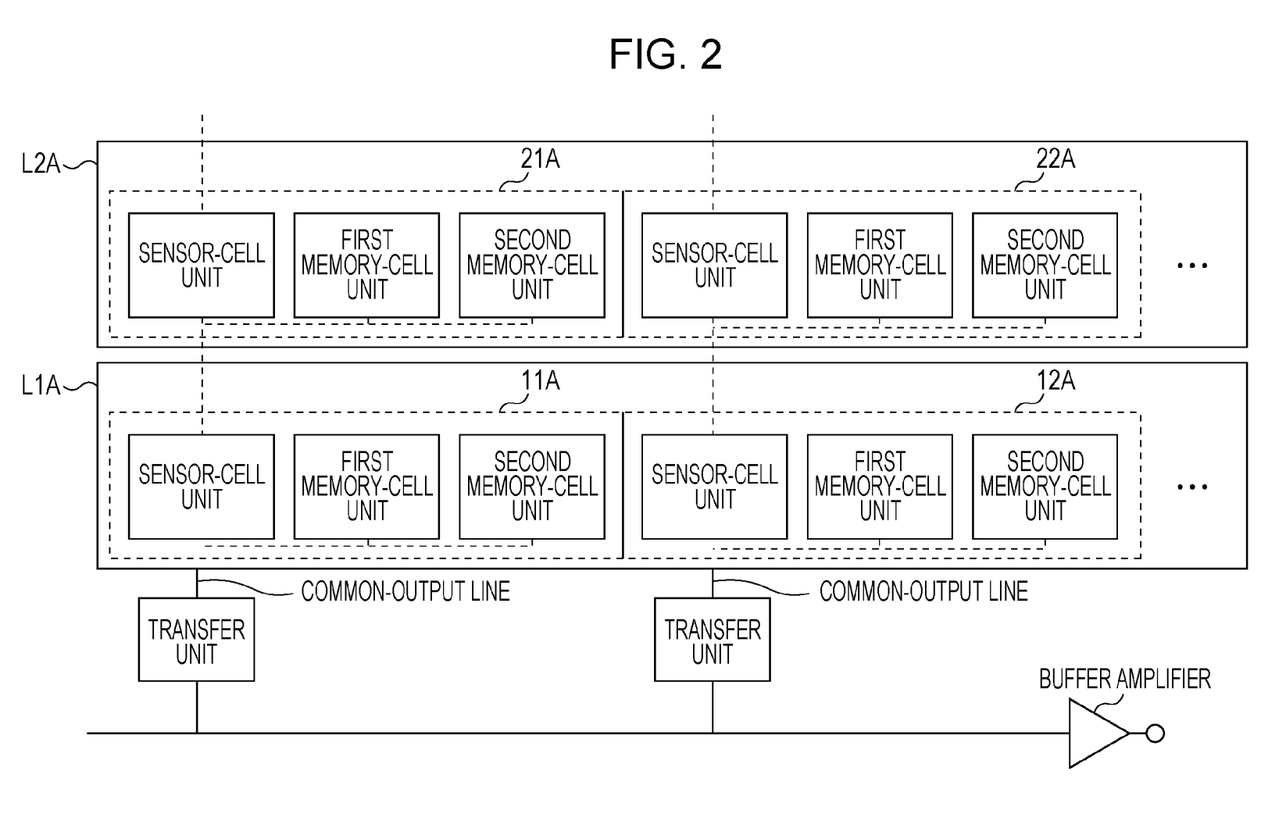
FIG. 2 is a block diagram illustrating a line-sensor unit according to the first embodiment.

FIG. 2 is a block diagram illustrating a part relating to the line-sensor units L1A, L2A, and so forth in more detail. Each of unit pixels includes a sensor-cell unit, a first memory-cell unit, and a second memory-cell unit, and is connected to a common-output line. Further, unit pixels of line-sensor units that are provided at positions equivalent to one another are connected to a common transfer unit via the common-output line. Each of the transfer units is connected to a common buffer amplifier. The configuration of each of the line-sensor units L1B, L2B, and so forth is the same as that illustrated in FIG. 2.

Figure 3:
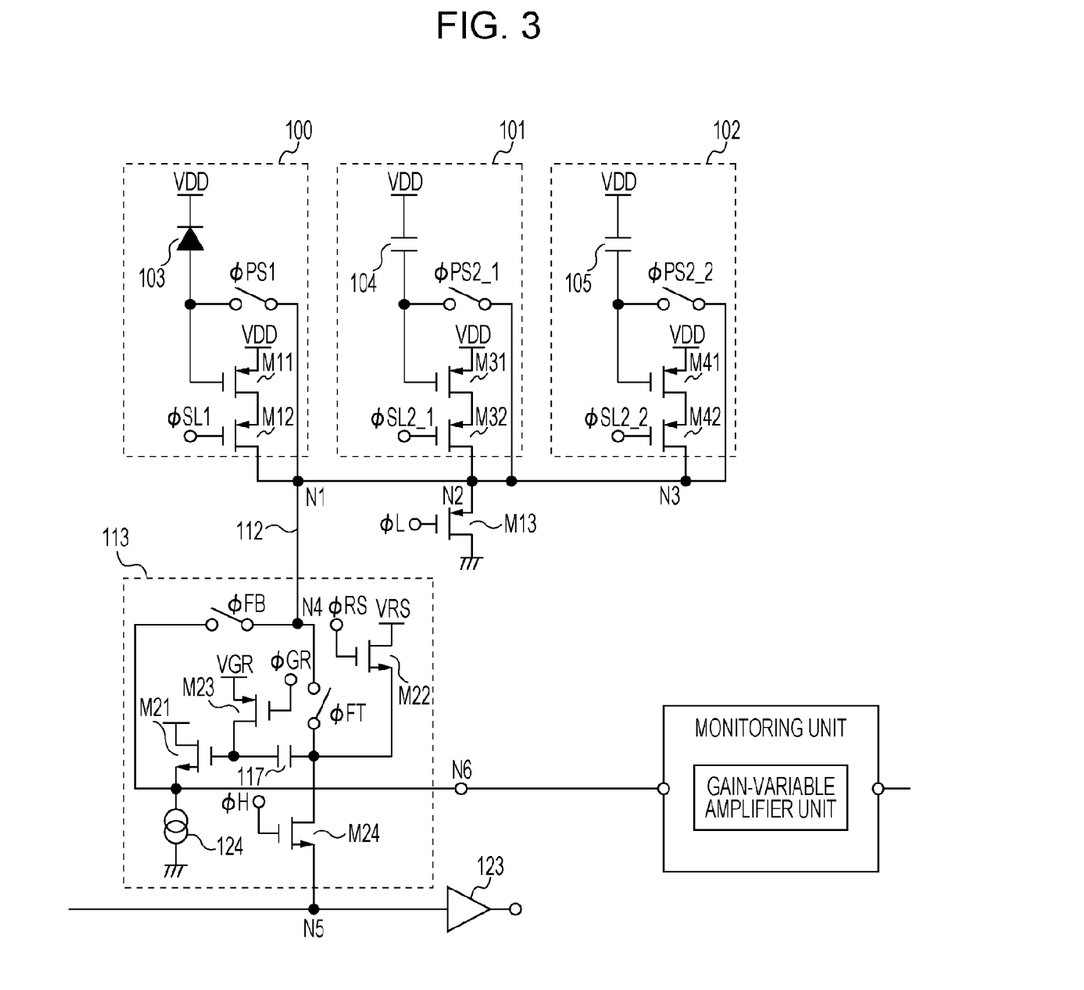
FIG. 3 is a circuit diagram of the photoelectric-conversion device according to the first embodiment.

FIG. 3 illustrates the line-sensor unit LS1 extracted from the configuration illustrated in FIG. 2, and particularly illustrates the unit pixel 11A and a transfer unit connected thereto.

The unit pixel 11A includes a sensor-cell unit 100, a first memory-cell unit 101, and a second memory-cell unit 102. In FIG. 3, the sign "φX" used to express each of the control electrodes and the switches of MOS transistors denotes a signal transmitted from a control unit (not shown).

As for the unit pixel 11A, the sensor-cell unit 100 includes a photodiode (PD) 103 which is a photoelectric-conversion unit, a sensor-cell-unit writing switch 106, and metal-oxide-semiconductor (MOS) transistors M11 and M12. The anode of the PD 103 is connected to one of terminals of the sensor-cell-unit writing switch 106 and the control electrode of the MOS transistor M11, and the cathode of the PD 103 is connected to a power voltage VDD. When the MOS transistor M12 is brought into conduction, the MOS transistors M11 and M12, and a load MOS transistor M13 form an inverting amplifier with a gain of −1. The sensor-cell unit 100 outputs an accumulation signal generated based on the amount of electrical charges that are obtained through the photoelectric conversion performed by the PD 103 to a common-output line 112 via the inverting amplifier. That is, the MOS transistor M12 functions as a selection switch used to select the sensor-cell unit 100. The sensor-cell-unit writing switch 106 is provided to switch between conduction and non-conduction states between the anode of the PD 103 and the common-output line 112. The sensor-cell-unit writing switch 106 may include a p-channel metal-oxide semiconductor (PMOS) transistor, an n-channel metal-oxide semiconductor (NMOS) transistor, a complementary metal-oxide semiconductor (CMOS) transistor, and so forth.

The configuration of each of the memory-cell units 101 and 102 is equivalent to that of the sensor-cell unit 100 except that the PD 103 provided in the sensor-cell unit 100 is replaced with each of the memory capacitances 104 and 105. Therefore, descriptions of each of the memory-cell units 101 and 102 will be omitted. In FIG. 3, the load-MOS transistor M13 is shared among the sensor-cell unit 100, and the memory-cell units 101 and 102. However, a single load-MOS transistor may be provided for each of the cell units.

Next, a transfer unit 113 will be described. The transfer unit 113 includes MOS transistors M21, M22, M23, and M24, a transfer capacitance 117, a feedback switch 120, and a transfer switch 121. One of terminals of the transfer switch 121 is connected to the common-output line 112 and one of terminals of the feedback switch 120. The other terminal of the transfer switch 121 is connected to one of terminals of the transfer capacitance 117 and one of main electrodes of each of the MOS transistors M22 and M24. The other main electrode of the MOS transistor M22 is connected to a power voltage VRS. The other main electrode of the MOS transistor M24, which is an optical-signal reading switch, is connected to a buffer amplifier 123. The other terminal of the transfer capacitance 117 is connected to the control electrode of the MOS transistor M21 and one of main electrodes of the MOS transistor M23. One of main electrodes of the MOS transistor M21 is connected to a power voltage VDD and the other main electrode of the MOS transistor M21 is connected to a constant-current source 124, a node N6, and the other terminal of the feedback switch 120. The transfer unit 113 performs processing for the difference between a signal output from the sensor-cell unit 100, and a reset noise written into each of the memory-cell units 101 and 102, and a noise generated in the transfer unit 113 by performing operations which will be described later.

Figure 4:
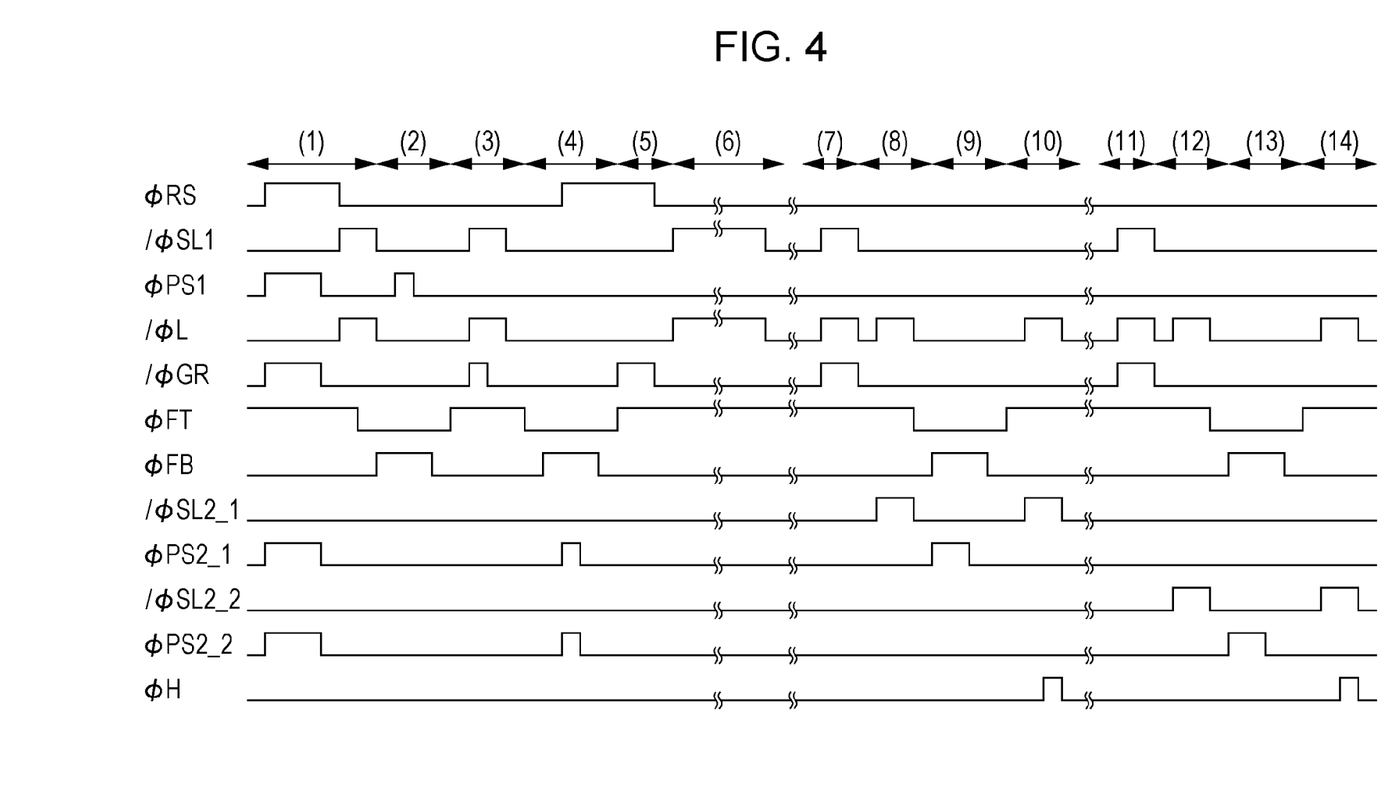
FIG. 4 is a timing chart according to the first embodiment.

Hereinafter, operations of the photoelectric-conversion device according to the present embodiment will be described with reference to FIGS. 3 and 4. FIG. 4 illustrates signals that are provided to the switches and/or the control electrodes of the MOS transistors that are illustrated in FIG. 3. The sign "/" is used to express a signal provided to the PMOS transistor as an inverted signal. Therefore, the switches and the MOS transistors are brought into conduction when the signals corresponding to the switches and the MOS transistors, the signals being illustrated in FIG. 4, go to high-level.

In a period (1), the PD 103, and the memory capacitances 104 and 105 are reset. Then, a noise Ns generated in the sensor-cell unit 100 due to the reset of the PD 103 is written into the transfer capacitance 117.

First, each of signals φRS, φFT, φPS1, φPS2_1, φPS2_2, and /φGR goes to high-level causing the sensor-cell-unit writing switch 106, the memory-cell unit writing switches 107 and 108, the transfer switch 121, and the MOS transistors M22 and M23 to be conductive. Accordingly, each of the PD 103, and the memory capacitances 104 and 105 is reset to the power voltage VRS and the electrodes of the transfer capacitance 117 are reset to the power voltage VRS and a power voltage VGS.

Next, the signal /φGR goes to low-level causing the other terminal of the transfer capacitance 117 to enter the floating state. When each of signals /φSL1 and /φL goes to high-level after each of the signals φPS1, φPS2_1, φPS2_2, and φRS goes to low-level, the sensor noise Ns generated after the reset of the sensor-cell unit 100 is written into the transfer capacitance 117.

When a signal φFB goes to high-level in a period (2), a noise Ns+Nt obtained by superimposing a noise Nt of the transfer unit 113 on the sensor noise Ns retained in the transfer capacitance 117 is output to the common-output line 112 through a source follower including the MOS transistor M21 and the constant-current source 124. The signal φPS1 temporarily goes to high-level in the period (2) so that the noise Ns+Nt is written into the sensor-cell unit 100. The accumulation-operation period of the sensor-cell unit 100 begins from the time when the signal φPS1 goes to low-level.

When each of the signals /φSL1 and /φL goes to high-level in a period (3), the noise Ns+Nt retained in the sensor-cell unit 100 is inverted and the sensor noise Ns is added to the inverted noise. Then, the inverted noise is output. That is, a noise−(Ns+Nt)+NS=−Nt is output from the sensor-cell unit 100. When each of the signals /φGR and φFT goes to high-level in this state, the noise −Nt is transmitted to one of the terminals of the transfer capacitance 117 and a power voltage VGR is transmitted to the other terminal of the transfer capacitance 117. When the signal /φGR goes to low-level after that, the other terminal of the transfer capacitance 117 enters the floating state and a potential difference of VGR+Nt is retained in the transfer capacitance 117.

When the signal φRS goes to high-level in a period (4), one of the terminals of the transfer capacitance 117 changes to the potential of the power voltage VRS and is varied by as much as the noise Nt of the transfer unit 113. Therefore, the other terminal of the transfer capacitance also is varied by as much as the noise Nt. As the signal φFB is at high-level at that time, a noise 2×Nt is output from the source follower of the transfer unit 113. Although not shown in the equation, a random noise (hereinafter referred to as a reset noise) generated due to the sensor-cell unit initialized in the period (1) is superimposed on the noise 2×Nt.

Further, as both the signals φPS2_1 and φPS2_2 go to high-level in the period (4), the noise 2×Nt is written into both of the memory-cell units 101 and 102 at one time via the switches 107 and 108. Here, the expression "at one time" denotes that the noise 2×Nt is written into both of the memory-cell units 101 and 102 in response to the signals φPS2_1 and φPS2_2 in the period where both the signals φRS and φFB are at high-level, the period being included in the period (4). That is, the signals φPS2_1 and φPS2_2 may not be changed to low-level simultaneously.

In a period (5), the signal φFT is at high-level. When the signals φRS and /φGR go to high-level in the period (5), the common-output line 112 and one of the terminals of the transfer capacitance 117 are reset to the power voltage VRS and the other terminal of the transfer capacitance 117 is reset to the power voltage VGR. After that, the signals φRS and /φGR go to low-level so that the other terminal of the transfer capacitance 117, that is, the input of the source follower is made to enter the floating state.

An AGC operation begins from a period (6). As the signals /φSL1 and φL go to high-level in the period (6), the inverting amplifier of the sensor-cell unit 100 operates so that the level corresponding to a signal S1 generated through the photo-electric conversion by the sensor-cell unit 100 appears on the common-output line 112. As the noise Ns+Nt had been written into the sensor-cell unit 100 through the operations that had been performed up to the period (5), the noise Ns caused by the sensor-cell unit 100 is added to —(S1+Ns+Nt) by the inverting function of the inverting amplifier. Therefore, a signal output from the sensor-cell unit 100 is expressed as—(S1+Nt). As a result, the other terminal of the transfer capacitance 117 is changed by as much as—(S1+Nt) so that the potential of the other terminal of the transfer capacitance 117 becomes VGR−(S1+Nt).

As a signal attained by adding the noise Nt of the transfer unit 113 to the above-described signal—(S1+Nt) is transmitted from the node N6 to a monitoring unit MON, the monitoring unit MON can monitor an optical signal S1 unaffected by the noise. A change in the output of the sensor-cell unit 100, which occurs in the period (6), is observed by the monitoring unit MON in real time via a terminal 122. The monitoring unit MON includes a gain-variable amplifier unit so that the gain is varied based on the result of contrast detection which will be described later. The above-described arrangement is referred to as automatic gain control (AGC). As a result of the monitoring operation performed by the monitoring unit MON, an optical signal −S2 is output from the sensor-cell unit 100 at the time when an accumulation operation performed in the period (6) is finished.

In a period (7) where the signal φFT is maintained at high-level, each of the signals /φSL1, /φL, and /φGR goes to high-level so that the potential of one of electrodes of the transfer capacitance 117 is changed from VRS by as much as—(S2+Nt).

When the signals /φSL2_1 and /φL go to high-level in a period (8), a noise Nm1 of the first memory-cell unit 101 is added to the noise 2Nt retained in the first memory-cell unit 101, and a noise −2Nt+Nm1 is transmitted to one of the terminals of the transfer capacitance 117. That is, the potential-variation amount corresponding to −2Nt+Nm1−(−(S2+Nt))=S2−Nt+Nm1 is retained in the transfer capacitance 117.

The signal φFT is at low-level in a period (9). When the signal /φPS2_1 goes to high-level in a period where the signal φFB is at high-level, the noise Nt transmitted from the transfer unit 113 is added to S2−Nt+Nm1, and S2+Nm1 is transmitted to the first memory-cell unit 101.

The signal φFB goes to low-level and the signal φFT goes to high-level in a period (10). The signals /φL and /φSL2_1 go to high-level in the period (10), and the signal S2+Nm1 retained in the first memory-cell unit 101 is inverted and output from the inverting amplifier. Then, the noise Nm1 of the first memory-cell unit 101 is added to the output signal, and a signal −S2 is transmitted to one of the terminals of the transfer capacitance 117. That is, a signal less affected by the noise is output as a result. When a signal φH is transmitted from a shift register (not shown) in the above-described period, the signal −S2 is transmitted to a buffer amplifier and is output to a signal-processing circuit (not shown) provided in the subsequent stage.

In periods (11) to (14), the operations corresponding to the periods (7) to (10) are performed for the second memory-cell unit 102, which makes it possible to acquire signals that are generated based on different accumulation periods from the sensor-cell unit 100 through a single accumulation sequence. Consequently, a focus-detection operation can be performed with high speed.

The above-described operation will be described in association with the operations of the entire focus-detection device while focusing on the couple of line-sensor units L1A and L1B.

In FIG. 1, the line-sensor units L1A and L1B are used to detect the amount of defocus an object image observed in a certain region of the imaging area, that is, the amount of a displacement from the focal position of the lens of an image pickup system.

As is the case with the focus-detection device disclosed in Japanese Patent Laid-Open No. 2006-220684, the line-sensor unit is divided into a plurality of regions. Then, the defocusing amount is detected near the center of each of the line-sensor units, that is, in a region which does not include an end of the line-sensor unit (the detection of a small amount of defocus). If a specified contrast is acquired under the above-described conditions, a signal is read by performing difference processing through the transfer unit 113 for noise reduction through the use of one of the memory-cell units that are provided in each of unit pixels.

On the other hand, if the specified contrast is not acquired near the center of each of the line-sensor units, that is, if the object image is in the large-defocusing state, the defocusing amount is detected in all of the regions of each of the line-sensor units. In that case, the difference processing is performed through the use of a memory-cell unit different from that used to perform the above-described small-defocusing amount detection. The specified contrast may be arbitrarily set based on uses and/or purposes.

Accordingly, when the object image is in the small-defocusing state, a high-speed operation can be performed by reading data of only part of the regions of the line-sensor unit. Further, when the object image is in the large-defocusing state, the accumulation operation may not be performed again by initializing the sensor-cell unit thereby realizing the high-speed operation.

Thus, the noise 2×Nt output from the transfer unit 113 is written into each of the memory-cell units 101 and 102 in the period (4) in the present embodiment of the invention. That is, a reset noise generated due to the initialization of the sensor-cell unit 100 is written into each of the memory-cell units 101 and 102. Although the two memory-cell units are exemplarily provided in the present embodiment, the number of the memory-cell units may be three or more. In that case, the operations corresponding to those performed in the periods (7) to (10) are performed for additional memory-cell units.

Figure 6:
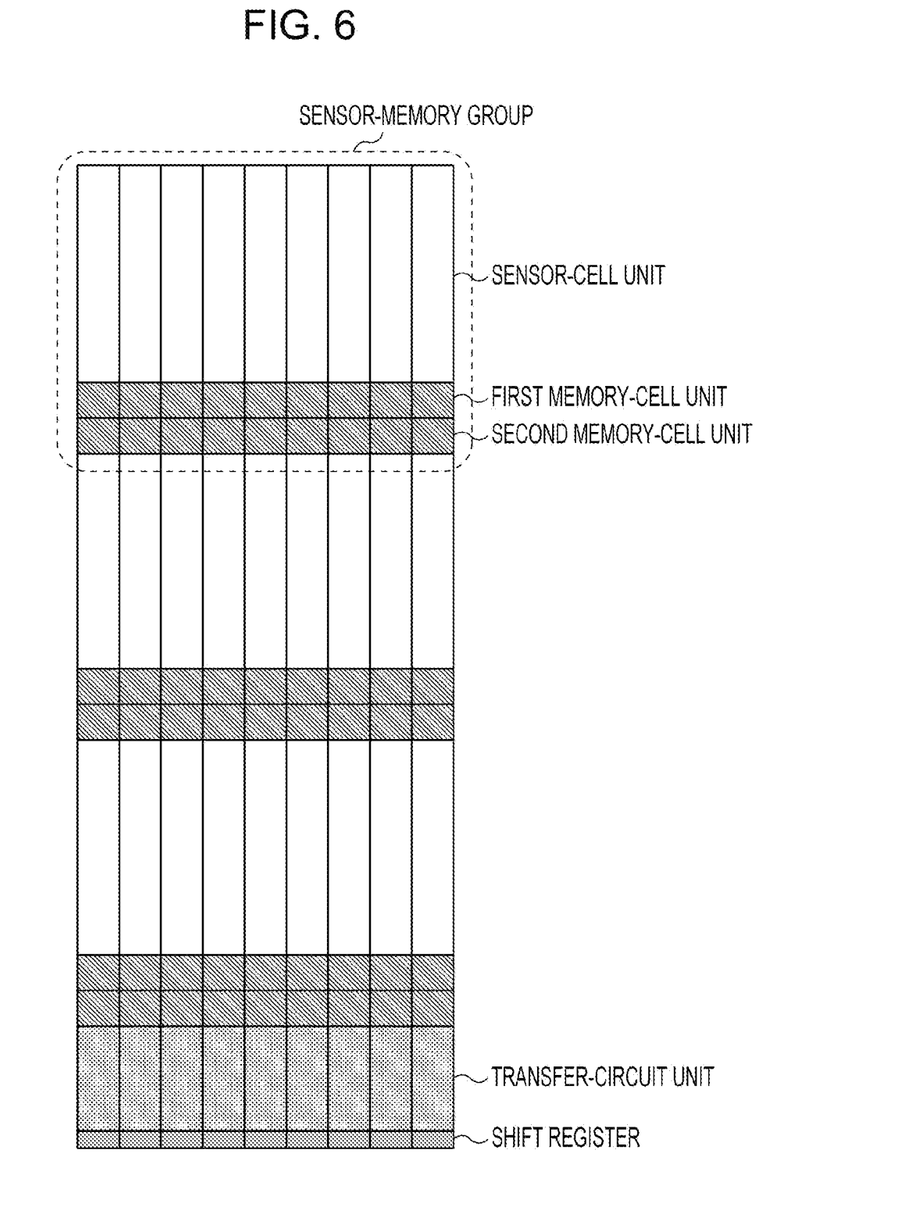
FIG. 6 illustrates an exemplary layout of the photoelectric-conversion device according to the first embodiment.
Figure 7:
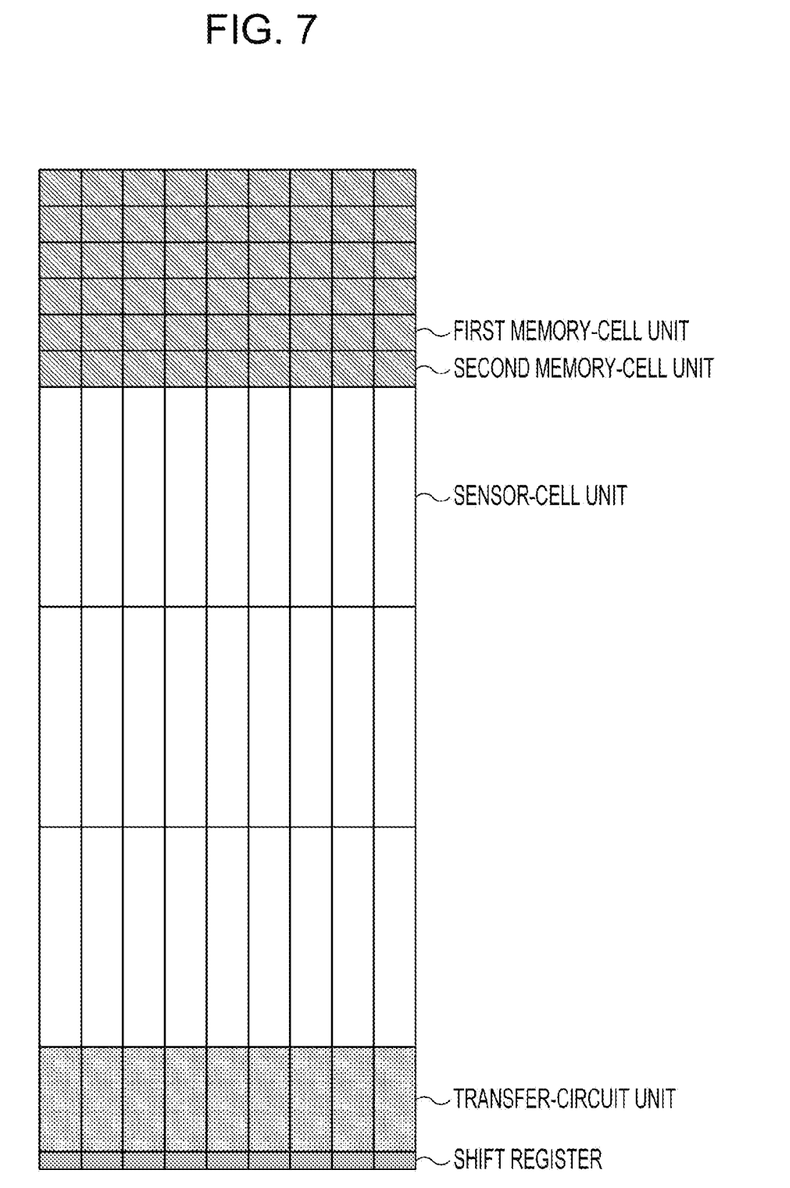
FIG. 7 illustrates a different exemplary layout of the photoelectric-conversion device according to the first embodiment.

An exemplary layout of the photoelectric-conversion device illustrated in FIG. 3 is illustrated in each of FIGS. 6 and 7. In FIG. 6, a sensor-cell unit and two memory-cell units are grouped and the groups of the sensor-cell unit and the two memory-cell units are arranged in matrix-form. A transfer-circuit unit and a shift register are provided for each of lines including the sensor-cell units and the memory-cell units.

FIG. 7 illustrates the layout including a separate region where only the sensor-cell units are provided and a separate region where only the memory-cell units are provided. In the above-described layout, the transfer-circuit unit and the shift register are provided for each of lines including the sensor-cell units and the memory-cell units.

Second Embodiment

Figure 5:
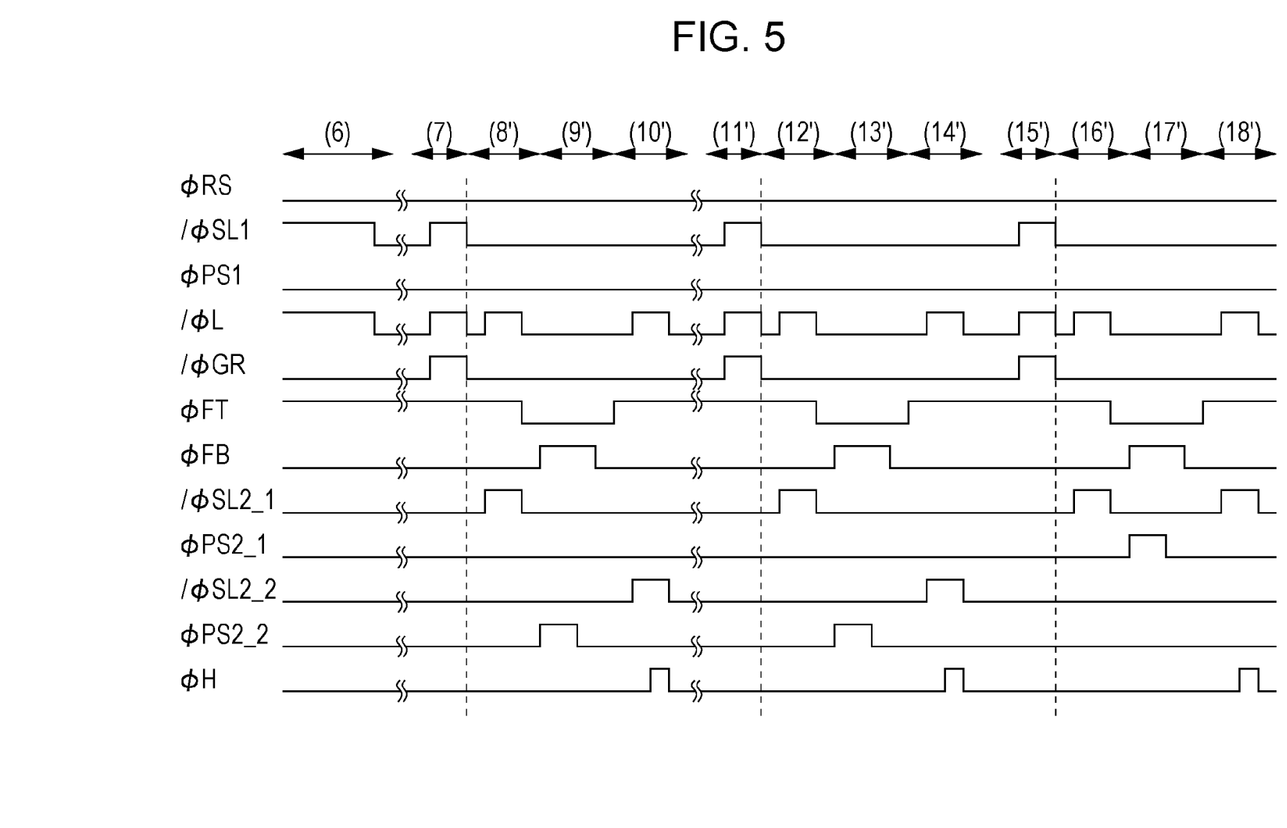
FIG. 5 is a timing chart according to a second embodiment of the present invention.

Operations of a second embodiment of the present invention will be described with reference to a timing chart illustrated in FIG. 5. As the above-described operations are equivalent to those illustrated in FIG. 4 from the period (1) to the period (8), the periods (1) to (5) are not illustrated in FIG. 5.

The present embodiment illustrates the operations of the photoelectric-conversion device, which are performed to determine whether or not a signal accumulated in the sensor-cell unit of each of the line-sensor units reaches a desired level (hereinafter referred to as the accumulation level) by specified time.

The signal φFT is at low-level in a period (9'). When the signals φFB and φPS2_2 temporarily go to high level in the period (9'), a signal S2(t1)+Nm1 obtained by adding the noise Nt of the transfer unit 113 to the signal S2(t1)−Nt+Nm1 described with reference to the period (8) illustrated in the first embodiment is written into the second memory-cell unit 102. Here, the sign S2(t1) denotes a signal obtained at time t1, which is equivalent to the signal S2 described in the first embodiment.

The signal φFB goes to low-level and the signal φFT goes to high-level in a period (10'). When the signals /φL and /φSL2_2 go to high-level in the period (10'), the signal S2(t1)+Nm1 retained in the second memory-cell unit 102 is inverted and the noise Nm2 is added thereto. As a result, a signal—(S2(t1)+Nm1)+Nm2 is output to the common-output line 112. Further, upon receiving the signal φH transmitted from a shift register (not shown), the buffer amplifier 123 transmits the signal φH to a signal-processing unit (not shown). The signal-processing unit determines whether or not the signal read at the time t1 via the buffer amplifier 123 in the above-described manner reaches the accumulation level. Thus, the noise Nm2−Nm1 superimposed on the read signal is sufficiently small compared to the level of the signal S2 for monitoring. Therefore, the signal is less affected by the noise.

If it is determined that the signal S2(t1) read at the time t1 does not reach a specified accumulation-finish level, the operations equivalent to those performed in the periods (8') to (11') are performed again and a signal read at time t2 is output from the second memory-cell unit 102. From then on, the above-described operations are repeatedly performed until an acquired signal reaches the specified accumulation-finish level. Here, the specified accumulation-finish level may be set based on purposes.

As stated above, the signals are repeatedly read from the second memory-cell unit 102 based on the noise 2×Nt retained in the first memory-cell unit 101 so that the signal level can be monitored through the signal-processing unit provided in the stage subsequent to the buffer amplifier. Since the signal-processing unit can be provided in the stage subsequent to the buffer amplifier, the signal-processing unit is provided on a semiconductor substrate different from that of the line-sensor units, which makes it easier to lay out the line-sensor units.

Third Embodiment

Figure 8:
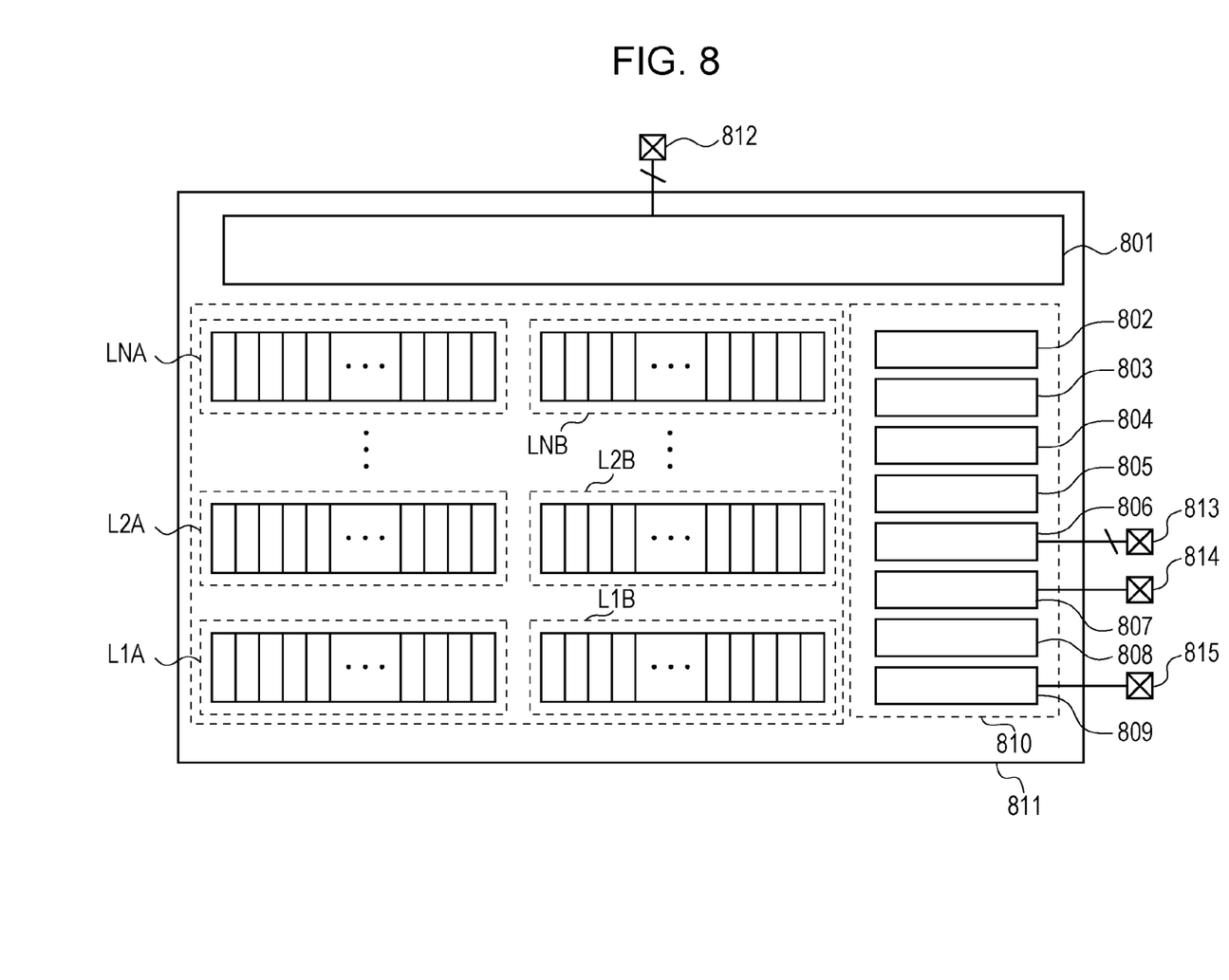
FIG. 8 is a block diagram illustrating an exemplary configuration of a focus-detection device (AF sensor) according to a third embodiment of the present invention.

A third embodiment of the present invention will be described with reference to FIG. 8 which is a block diagram illustrating an exemplary configuration of a photoelectric-conversion device according to an embodiment of the present invention, where the photoelectric-conversion device is used for a phase-difference detection-type focus-detection device (hereinafter referred to as an AF sensor).

An AF sensor 811 includes a sensor block provided with an arrangement of the line-sensor units L1A, L2A, . . . , L1B, L2B, and so forth, a logic block 801 having an external interface and the function of generating a timing signal provided for the AF sensor 811, and an analog-circuit block 810.

The analog-circuit block 810 includes AGC circuits 802, 803, 804, and 805, and monitors a signal transmitted from the line-sensor unit and/or controls the accumulation time. The analog-circuit block 810 further includes a reference voltage-and-current generation circuit 806 configured to generate a reference voltage and/or a reference current used for the photoelectric-conversion device, a thermometer circuit 807, and so forth.

The logic block 801 performs serial communications with the outside via a serial-communication terminal 812 to control the drive timing of the AF sensor 811.

In the present embodiment, the focus-detection operation can also be performed with high speed through the use of the photoelectric-conversion device described in each of the first and second embodiments.

Fourth Embodiment

Figure 9:
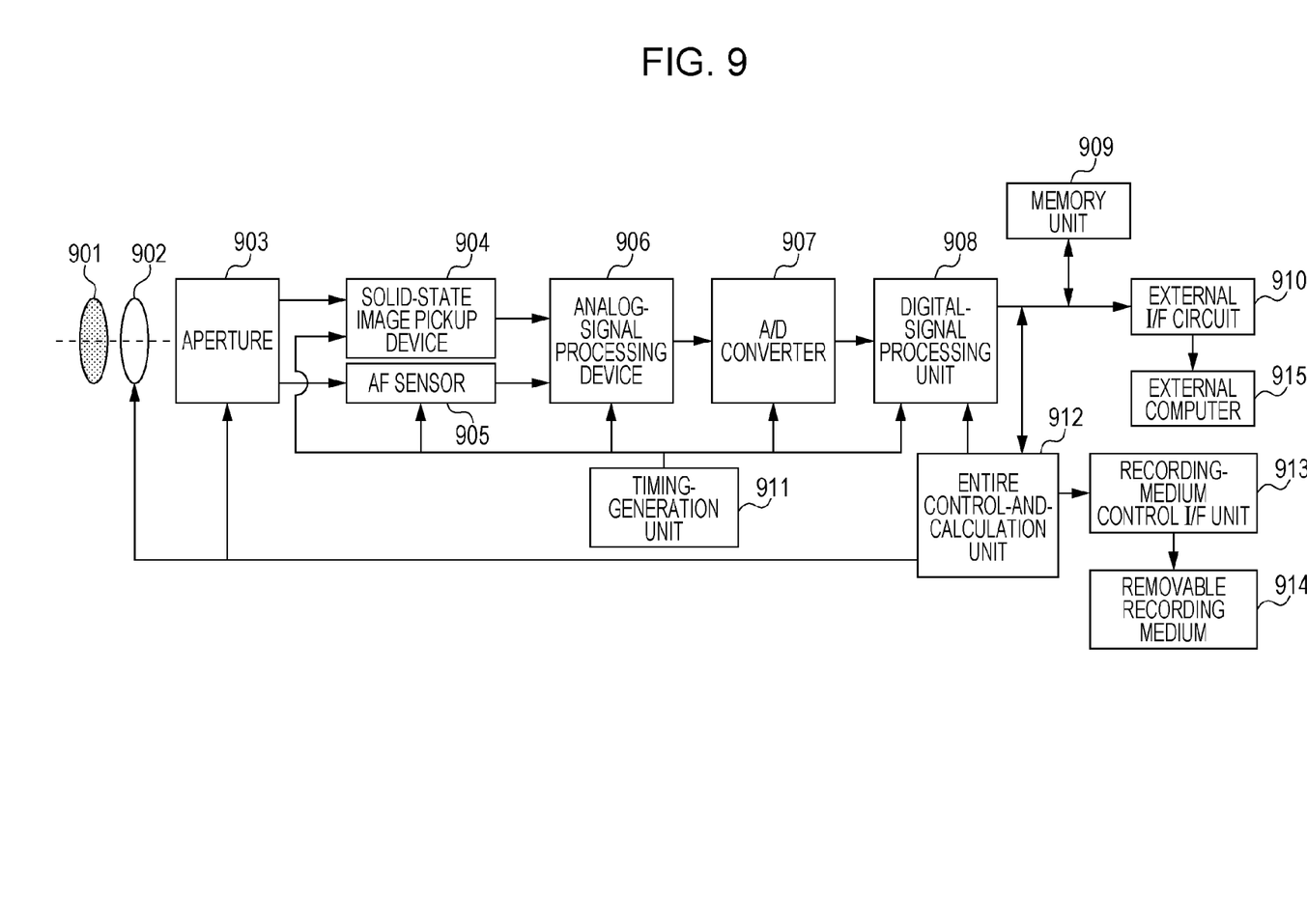
FIG. 9 is a block diagram illustrating an exemplary configuration of an image pickup system according to a fourth embodiment of the present invention.

FIG. 9 is a block diagram illustrating an exemplary configuration of an image pickup system according to a fourth embodiment of the present invention.

A barrier 901 configured to protect a lens which will be described later, a lens 902 configured to form the optical image of a subject in a solid-state image pickup device 904, and an aperture 903 configured to adjust the amount of light that had passed through the lens 902 are provided. The solid-state image pickup device 904 acquires the optical image of the object, which is formed through the lens 902, as an image signal. An AF sensor 905 includes the photoelectric-conversion device described in each of the above-described embodiments.

An analog-signal processing device 906 configured to process a signal output from the solid-state image pickup device 904 and/or the AF sensor 905, and an analog-to-digital (A/D) converter 907 configured to perform the A/D conversion for a signal output from the analog-signal processing device 906 are provided. A digital-signal processing unit 908 is provided to perform various types of correction and/or compress image data output from the A/D converter 907.

A memory unit 909 configured to temporarily store the image data, an external I/F circuit 910 configured to communicate with an external computer, for example, and a timing-generation unit 911 configured to output various types of timing signals to, for example, the digital-signal processing unit 908 are provided. An entire control-and-calculation unit 912 configured to perform various types of calculations and control the entire camera, a recording-medium control I/F unit 913, a removable recording medium 914, which includes a semiconductor memory or the like, configured to record and/or read acquired image data, and an external computer 915 are provided.

Next, operations of the above-described image pickup system, which are performed at the imaging time, will be described.

The barrier 901 is opened and the entire control-and-calculation unit 912 calculates the distance from the image pickup system to the subject through the above-described phase-difference detection based on the signal output from the AF sensor 905. Then, the lens 902 is driven based on the calculation result, and it is determined whether or not focusing is achieved again. If it is determined that no focusing is achieved, autofocus control is performed to drive the lens 902 again. Then, the solid-state image pickup device 904 starts performing the accumulation operation after the focusing is confirmed. When the accumulation operation of the solid-state image pickup device 904 is finished, an image signal output from the solid-state image pickup device 904 is subjected to the A/D conversion through the A/D converter 907, passes through the digital-signal processing unit 908, and is written into the memory unit 909 through the entire control-and-calculation unit 912. After that, data accumulated in the memory unit 909 is recorded onto the recording medium 914 via the recording-medium control I/F unit 913 under the control of the entire control-and-calculation unit 912. Otherwise, the data accumulated in the memory unit 909 may be directly transmitted to a computer or the like via the external I/F unit 910.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278007 filed on Dec. 7, 2009, which is hereby incorporated by reference herein in its entirety.

What is claimed is:

1. A focus-detection device comprising:
    a pair of line-sensor units,
    wherein each line-sensor unit includes a plurality of unit pixels each having a sensor-cell unit that outputs a signal obtained by photoelectric conversion, and a plurality of memory-cell units,
    wherein the focus-detection device writes, in a temporally overlapped manner, a reset noise generated due to initialization of one of the sensor-cell units into each of the corresponding memory-cell units,
    wherein the device further comprises a transfer unit configured to receive a signal from the unit pixel and to transfer the signal to the unit pixel, where the transfer unit performs a difference processing between the signal from the sensor-cell unit, and the reset noise written in the corresponding memory-cell unit and a noise generated in the transfer unit,
    wherein, for a first region of each of the line-sensor units, the focus-detection device performs the difference processing using one of the memory-cell units of each of the unit pixels, and detects the defocusing amount from a second region of each of the line-sensor units, the second region being of a wider region of the line-sensor unit and performs the difference processing through a memory-cell unit different from the one of the memory-cell units of each of the unit pixels.

2. An image pickup system comprising the focus-detection device according to claim 1.

3. The image pickup system according to claim 2, wherein the focus-detection device is a phase-difference detection-type focus-detection device.

4. The image pickup system according to claim 1, wherein a noise generated in the transfer unit is included in the reset noise.

5. The focus-detection device according to claim 1, wherein each of the sensor-cell units includes a photoelectric-conversion unit and an amplifying unit configured to amplify and output a signal based on an electrical charge generated in the photoelectric-conversion unit.

\* \* \* \* \*